(12) United States Patent
Park et al.

(10) Patent No.: US 7,586,985 B2
(45) Date of Patent: Sep. 8, 2009

(54) METHOD AND APPARATUS FOR ENCODING/DECODING VIDEO SIGNAL USING REFERENCE PICTURES

(75) Inventors: Seung Wook Park, Seoul (KR); Ji Ho Park, Seoul (KR); Byeong Moon Jeon, Seoul (KR); Doe Hyun Yoon, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 12/419,159

(22) Filed: Apr. 6, 2009

(65) Prior Publication Data

US 2009/0180550 A1  Jul. 16, 2009

Related U.S. Application Data

(63) Continuation of application No. 11/401,318, filed on Apr. 11, 2006.

(60) Provisional application No. 60/670,676, filed on Apr. 13, 2005.

(30) Foreign Application Priority Data

Jul. 22, 2005  (KR) ............... 10-2005-0066622

(51) Int. Cl.
*H04N 7/12* (2006.01)
(52) U.S. Cl. ............. 375/240.01; 375/240; 375/240.12; 375/240.25
(58) Field of Classification Search ........... 375/240, 375/240.01, 240.12, 240.25
See application file for complete search history.

(56) References Cited

U.S. PATENT DOCUMENTS

| | | | |
|---|---|---|---|
| 5,973,739 A | 10/1999 | Nilsson | |
| 6,057,884 A | 5/2000 | Chen et al. | |
| 6,510,177 B1 | 1/2003 | De Bonet et al. | |
| 6,535,559 B2 | 3/2003 | Yagasaki et al. | |
| 6,549,575 B1 | 4/2003 | Butter et al. | |
| 6,697,426 B1 * | 2/2004 | Van Der Schaar et al. .............. | 375/240.01 |
| 6,728,317 B1 | 4/2004 | Demos | |
| 6,788,347 B1 | 9/2004 | Kim et al. | |
| 6,836,512 B2 | 12/2004 | Van Der Schaar et al. | |
| 6,847,685 B1 | 1/2005 | Fujiwara et al. | |
| 2004/0008790 A1 | 1/2004 | Rodriguez | |
| 2004/0114689 A1 | 6/2004 | Zhang et al. | |
| 2007/0086515 A1 | 4/2007 | Kirkenko et al. | |

(Continued)

FOREIGN PATENT DOCUMENTS

KR  10-1997-0064261  9/1997

(Continued)

OTHER PUBLICATIONS

Taiwanese Office Action dated Apr. 14, 2009 with English translation.

*Primary Examiner*—Allen Wong
(74) *Attorney, Agent, or Firm*—Harness, Dickey & Pierce, PLC (57) ABSTRACT

In the method for decoding a video signal, at least a portion of a current image in a current layer is predicted based on at least a portion of a reference image and offset information. The offset information may indicate a position offset between at least one boundary pixel of the reference image and at least one boundary pixel of the current image.

2 Claims, 9 Drawing Sheets

U.S. PATENT DOCUMENTS

2007/0116131 A1    5/2007   Sun
2007/0140354 A1    6/2007   Sun

FOREIGN PATENT DOCUMENTS

| | | |
|---|---|---|
| KR | 10-1999-0070553 | 9/1999 |
| KR | 10-2002-0064932 | 8/2002 |
| KR | 10-2003-0020382 | 3/2003 |
| KR | 10-2003-0089505 | 11/2003 |
| KR | 10-2004-0096548 | 11/2004 |
| KR | 10-2004-0107437 | 12/2004 |
| KR | 10-2005-0049644 | 5/2005 |
| WO | WO 03/047260 A2 | 6/2003 |

\* cited by examiner

METHOD AND APPARATUS FOR ENCODING/DECODING VIDEO SIGNAL USING REFERENCE PICTURES

DOMESTIC PRIORITY INFORMATION

This application is a continuation of and claims priority under 35 U.S.C. § 120 to co-pending application Ser. No. 11/401,318 "METHOD AND APPARATUS FOR ENCODING/DECODING VIDEO SIGNAL USING REFERENCE PICTURES" filed Apr. 11, 2006, the entirety of which is incorporated by reference. This application also claims priority under 35 U.S.C. §119 on U.S. Provisional Application No. 60/670,676, filed on Apr. 13, 2005, the entire contents of which are hereby incorporated by reference.

FOREIGN PRIORITY INFORMATION

This application claims priority under 35 U.S.C. §119 on Korean Patent Application No. 10-2005-0066622, filed on Jul. 22, 2005, the entire contents of which are hereby incorporated by reference.

BACKGROUND OF THE INVENTION

1. Field of the Invention

The present invention relates to scalable encoding and decoding of a video signal, and more particularly to a method and apparatus for encoding a video signal, wherein a base layer in the video signal is additionally used to code an enhanced layer in the video signal, and a method and apparatus for decoding such encoded video data.

2. Description of the Related Art

Scalable Video Codec (SVC) is a method which encodes video into a sequence of pictures with the highest image quality while ensuring that part of the encoded picture sequence (specifically, a partial sequence of frames intermittently selected from the total sequence of frames) can also be decoded and used to represent the video with a low image quality. Motion Compensated Temporal Filtering (MCTF) is an encoding scheme that has been suggested for use in the scalable video codec.

Although it is possible to represent low image-quality video by receiving and processing part of the sequence of pictures encoded in a scalable fashion as described above, there is still a problem in that the image quality is significantly reduced if the bitrate is lowered. One solution to this problem is to hierarchically provide an auxiliary picture sequence for low bitrates, for example, a sequence of pictures that have a small screen size and/or a low frame rate, so that each decoder can select and decode a sequence suitable for its capabilities and characteristics. One example is to encode and transmit not only a main picture sequence of 4CIF (Common Intermediate Format) but also an auxiliary picture sequence of CIF and an auxiliary picture sequence of QCIF (Quarter CIF) to decoders. Each sequence is referred to as a layer, and the higher of two given layers is referred to as an enhanced layer and the lower is referred to as a base layer.

Such picture sequences have redundancy since the same video signal source is encoded into the sequences. To increase the coding efficiency of each sequence, there is a need to reduce the amount of coded information of the higher sequence by performing inter-sequence picture prediction of video frames in the higher sequence from video frames in the lower sequence temporally coincident with the video frames in the higher sequence.

However, video frames in sequences of different layers may have different aspect ratios. For example, video frames of the higher sequence (i.e., the enhanced layer) may have a wide aspect ratio of 16:9, whereas video frames of the lower sequence (i.e., the base layer) may have a narrow aspect ratio of 4:3. In this case, there is a need to determine which part of a base layer picture is to be used for an enhanced layer picture or for which part of the enhanced layer picture the base layer picture is to be used when performing prediction of the enhanced layer picture.

SUMMARY OF THE INVENTION

The present invention relates to decoding and encoding a video signal as well as apparatuses for encoding and decoding a video signal.

In one embodiment of the method for decoding a video signal, at least a portion of a current image in a current layer is predicted based on at least a portion of a reference image and offset information. The offset information may indicate a position offset between at least one boundary pixel of the reference image and at least one boundary pixel of the current image.

In one embodiment, the reference image is based on a base image in a base layer. For example, the reference image may be at least an up-sampled portion of the base image.

In one embodiment, the offset information includes left offset information indicating a position offset between at least one left side pixel of the reference image and at least one left side pixel of the current image.

In another embodiment, the offset information includes top offset information indicating a position offset between at least one top side pixel of the reference image and at least one top side pixel of the current image.

In a further embodiment, the offset information includes right offset information indicating a right position offset between at least one right side pixel of the reference image and at least one right side pixel of the current image.

In yet another embodiment, the offset information includes bottom offset information indicating a bottom position offset between at least one bottom side pixel of the reference image and at least one bottom side pixel of the current image.

In one embodiment, the offset information may be obtained from a header for at least a portion of a picture (e.g., a slice, frame, etc.) in the current layer. Also, it may be determined that the offset information is present based on an indicator in the header.

Other embodiments include methods of encoding a video signal, and apparatuses for encoding and for decoding a video signal.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF EXAMPLE EMBODIMENTS

Example embodiments of the present invention will now be described in detail with reference to the accompanying drawings.

Figure 1:
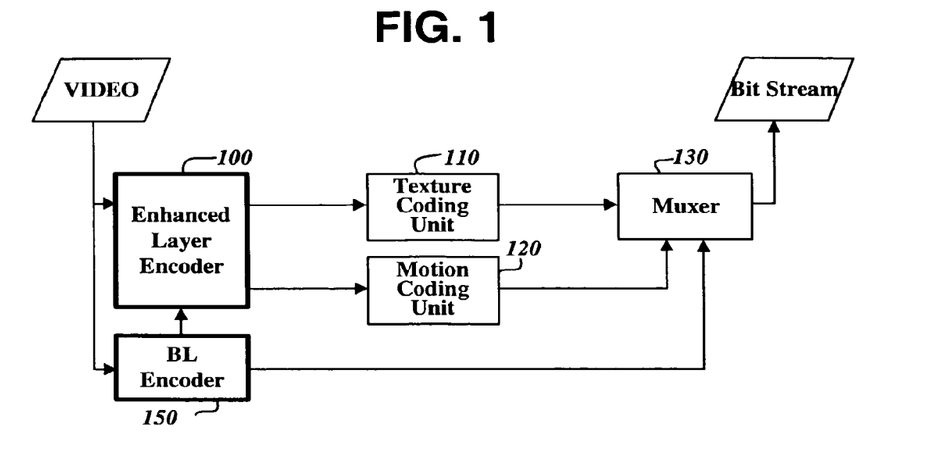
FIG. 1 is a block diagram of a video signal encoding apparatus to which a scalable video signal coding method according to the present invention is applied.

FIG. 1 is a block diagram of a video signal encoding apparatus to which a scalable video signal coding method according to the present invention is applied. Although the apparatus of FIG. 1 is implemented to code an input video signal in two layers, principles of the present invention described below can also be applied when a video signal is coded in three or more layers. The present invention can also be applied to any scalable video coding scheme, without being limited to an MCTF scheme which is described below as an example.

The video signal encoding apparatus shown in FIG. 1 comprises an MCTF encoder 100 to which the present invention is applied, a texture coding unit 110, a motion coding unit 120, a base layer encoder 150, and a muxer (or multiplexer) 130. The MCTF encoder 100 is an enhanced layer encoder which encodes an input video signal on a per macroblock basis according to an MCTF scheme and generates suitable management information. The texture coding unit 110 converts information of encoded macroblocks into a compressed bitstream. The motion coding unit 120 codes motion vectors of image blocks obtained by the MCTF encoder 100 into a compressed bitstream according to a specified scheme. The base layer encoder 150 encodes an input video signal according to a specified scheme, for example, according to the MPEG-1, 2 or 4 standard or the H.261, H.263 or H.264 standard, and produces a small-screen picture sequence, for example, a sequence of pictures scaled down to 25% of their original size. The muxer 130 encapsulates the output data of the texture coding unit 110, the small-screen picture sequence output from the base layer encoder 150, and the output vector data of the motion coding unit 120 into a desired format. The muxer 130 then multiplexes and outputs the encapsulated data into a desired transmission format. The base layer encoder 150 can provide a low-bitrate data stream not only by encoding an input video signal into a sequence of pictures having a smaller screen size than pictures of the enhanced layer, but also by encoding an input video signal into a sequence of pictures having the same screen size as pictures of the enhanced layer at a lower frame rate than the enhanced layer. In the embodiments of the present invention described below, the base layer is encoded into a small-screen picture sequence, and the small-screen picture sequence is referred to as a base layer sequence and the frame sequence output from the MCTF encoder 100 is referred to as an enhanced layer sequence.

Figure 2:
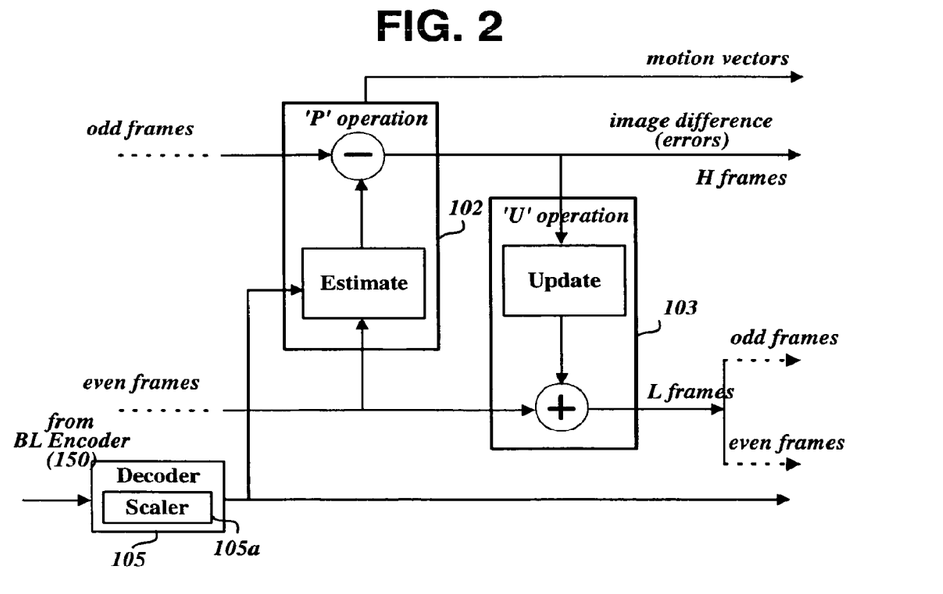
FIG. 2 is a block diagram of part of an MCTF encoder shown in FIG. 1 responsible for carrying out image estimation/prediction and update operations.

The MCTF encoder 100 performs motion estimation and prediction operations on each target macroblock in a video frame. The MCTF encoder 100 also performs an update operation for each target macroblock by adding an image difference of the target macroblock from a corresponding macroblock in a neighbor frame to the corresponding macroblock in the neighbor frame. FIG. 2 illustrates some elements of the MCTF encoder 100 for carrying out these operations.

The elements of the MCTF encoder 100 shown in FIG. 2 include an estimator/predictor 102, an updater 103, and a decoder 105. The decoder 105 decodes an encoded stream received from the base layer encoder 150, and enlarges decoded small-screen frames to the size of frames in the enhanced layer using an internal scaler 105a. The estimator/predictor 102 searches for a reference block of each macroblock in a current frame, which is to be coded into residual data, in adjacent frames prior to or subsequent to the current frame and in frames enlarged by the scaler 105a. The estimator/predictor 102 then obtains an image difference (i.e., a pixel-to-pixel difference) of each macroblock in the current frame from the reference block or from a corresponding block in a temporally coincident frame enlarged by the scaler 105a, and codes the image difference into the macroblock. The estimator/predictor 102 also obtains a motion vector originating from the macroblock and extending to the reference block. The updater 103 performs an update operation for a macroblock in the current frame, whose reference block has been found in frames prior to or subsequent to the current frame, by multiplying the image difference of the macroblock by an appropriate constant (for example, ½ or ¼) and adding the resulting value to the reference block. The operation carried out by the updater 103 is referred to as a 'U' operation, and a frame produced by the 'U' operation is referred to as an 'L' frame.

The estimator/predictor 102 and the updater 103 of FIG. 2 may perform their operations on a plurality of slices, which are produced by dividing a single frame, simultaneously and in parallel instead of performing their operations on the video frame. A frame (or slice) having an image difference, which is produced by the estimator/predictor 102, is referred to as an 'H' frame (or slice). The 'H' frame (or slice) contains data having high frequency components of the video signal. In the following description of the embodiments, the term 'picture' is used to indicate a slice or a frame, provided that the use of the term is technically feasible.

The estimator/predictor 102 divides each of the input video frames (or L frames obtained at the previous level) into macroblocks of a desired size. For each divided macroblock, the estimator/predictor 102 searches for a block, whose image is most similar to that of each divided macroblock, in previous/next neighbor frames of the enhanced layer and/or in base layer frames enlarged by the scaler 105a. That is, the estimator/predictor 102 searches for a macroblock temporally correlated with each divided macroblock. A block having the most similar image to a target image block has the smallest image difference from the target image block. The image difference of two image blocks is defined, for example, as the sum or average of pixel-to-pixel differences of the two image blocks. Of blocks having a threshold image difference or less from a target macroblock in the current frame, a block having the smallest image difference from the target macroblock is referred to as a reference block. A picture including the reference block is referred to as a reference picture. For each macroblock of the current frame, two reference blocks (or two reference pictures) may be present in a frame (including a base layer frame) prior to the current frame, in a frame (including a base layer frame) subsequent thereto, or one in a prior frame and one in a subsequent frame.

If the reference block is found, the estimator/predictor 102 calculates and outputs a motion vector from the current block to the reference block. The estimator/predictor 102 also calculates and outputs pixel error values (i.e., pixel difference values) of the current block from pixel values of the reference block, which is present in either the prior frame or the subsequent frame, or from average pixel values of the two reference blocks, which are present in the prior and subsequent frames. The image or pixel difference values are also referred top as residual data.

If no macroblock having a desired threshold image difference or less from the current macroblock is found in the two neighbor frames (including base layer frames) via the motion estimation operation, the estimator/predictor 102 determines whether or not a frame in the same time zone as the current frame (hereinafter also referred to as a "temporally coincident frame") or a frame in a close time zone to the current frame (hereinafter also referred to as a "temporally close frame") is present in the base layer sequence. If such a frame is present in the base layer sequence, the estimator/predictor 102 obtains the image difference (i.e., residual data) of the current macroblock from a corresponding macroblock in the temporally coincident or close frame based on pixel values of the two macroblocks, and does not obtain a motion vector of the current macroblock with respect to the corresponding macroblock. The close time zone to the current frame corresponds to a time interval including frames that can be regarded as having the same image as the current frame. Information of this time interval is carried within an encoded stream.

Figure 3A:
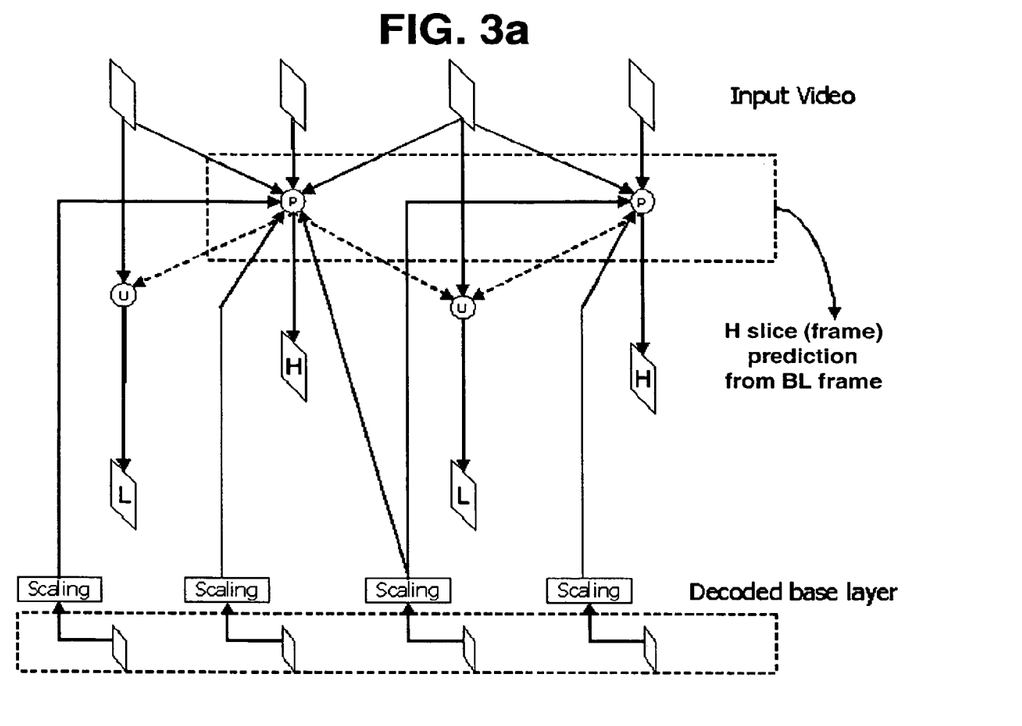
FIGS. 3a and 3b illustrate the relationship between enhanced layer frames and base layer frames which can be used as reference frames for converting an enhanced layer frame to an H frame having a predictive image.

The above operation of the estimator/predictor 102 is referred to as a 'P' operation. When the estimator/predictor 102 performs the 'P' operation to produce an H frame by searching for a reference block of each macroblock in the current frame and coding each macroblock into residual data, the estimator/predictor 102 can selectively use, as reference pictures, enlarged pictures of the base layer received from the scaler 105a, in addition to neighbor L frames of the enhanced layer prior to and subsequent to the current frame, as shown in FIG. 3a.

Figure 3B:
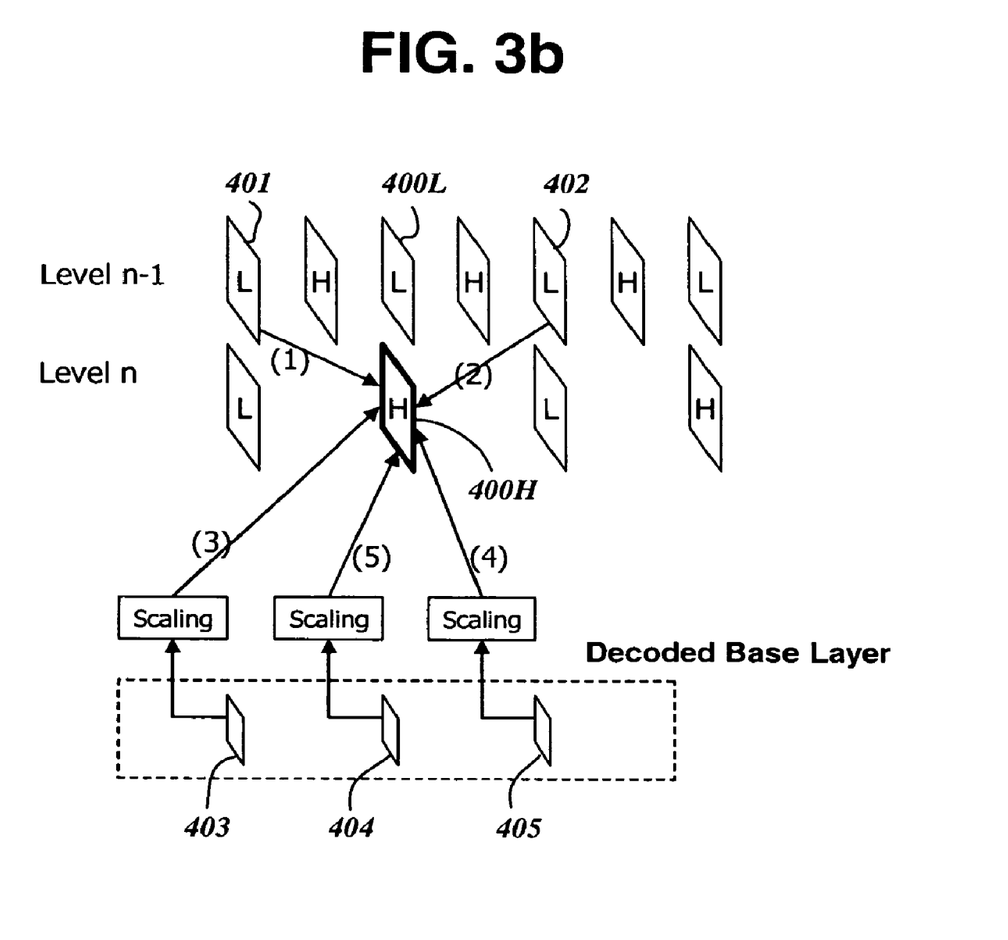

In an example embodiment of the present invention, five frames are used to produce each H frame. FIG. 3b shows five frames that can be used to produce an H frame. As shown, a current L frame 400L has L frames 401 prior to and L frames 402 subsequent to the current L frame 400L. The current L frame 400L also has a base layer frame 405 in the same time zone. One or two frames from among the L frames 401 and 402 in the same MCTF level as a current L frame 400L, the frame 405 of the base layer in the same time zone as the L frame 400L, and base layer frames 403 and 404 prior to and subsequent to the frame 405 are used as reference pictures to produce an H frame 400H from the current L frame 400L. As will be appreciated from the above discussion, there are various reference block selection modes. To inform the decoder of which mode is employed, the MCTF encoder 100 transmits 'reference block selection mode' information to the texture coding unit 110 after inserting/writing it into a field at a specified position of a header area of a corresponding macroblock.

Figure 4:
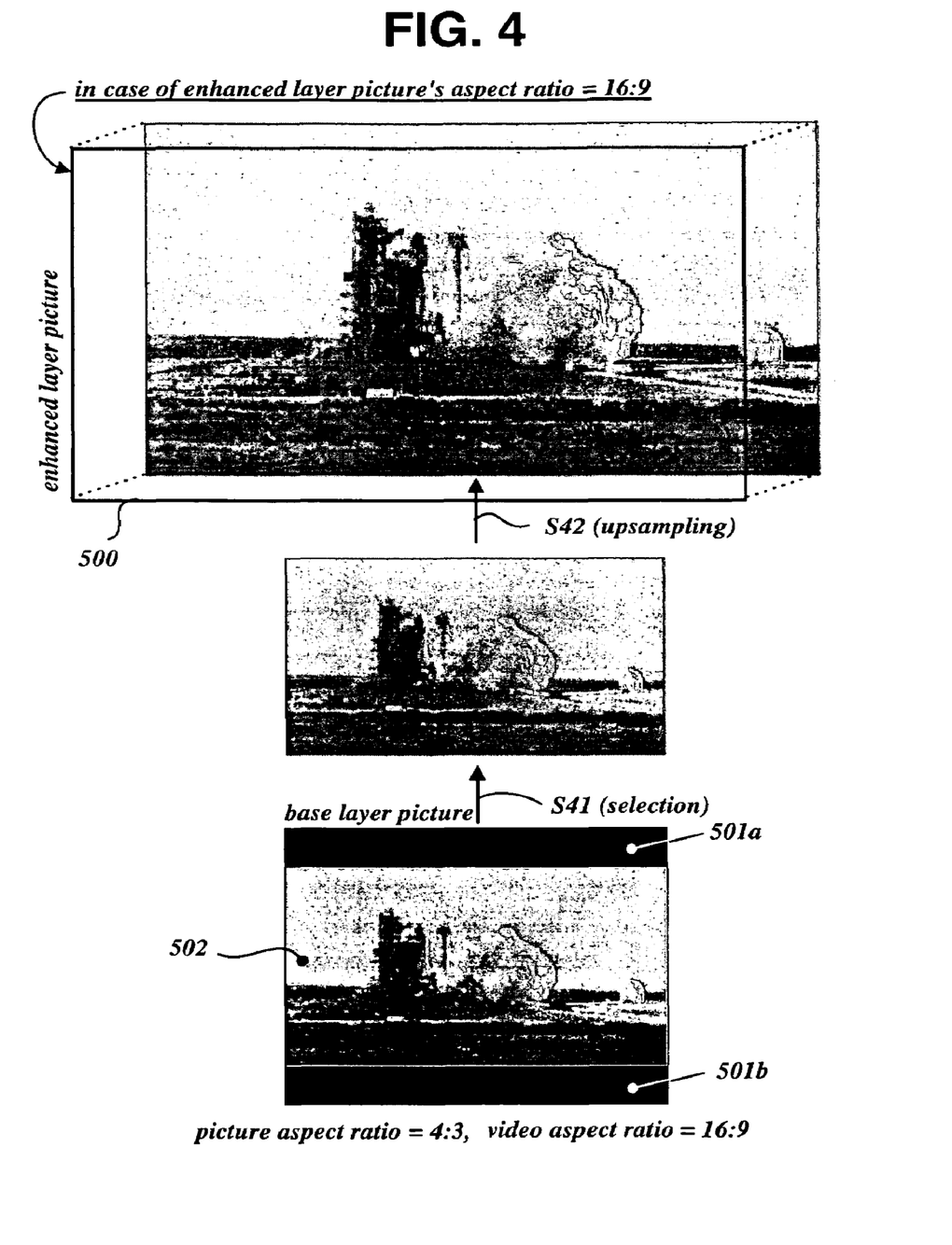
FIG. 4 illustrates how part of a base layer picture is selected and enlarged to be used for a prediction operation of an enhanced layer picture according to an embodiment of the present invention.

When a picture of the base layer is selected as a reference picture for prediction of a picture of the enhanced layer in the reference picture selection method as shown in FIG. 3b, all or part of the base layer picture can be used for prediction of the enhanced layer picture. For example, as shown in FIG. 4, when a base layer picture has an aspect ratio of 4:3, an actual image portion 502 of the base layer picture has an aspect ratio of 16:9, and an enhanced layer picture 500 has an aspect ratio of 16:9, upper and lower horizontal portions 501a and 501b of the base layer picture contain invalid data. In this case, only the image portion 502 of the base layer picture is used for prediction of the enhanced layer picture 500. To accomplish this, the scaler 105a selects (or crops) the image portion 502 of the base layer picture (S41), up-samples the selected image portion 502 to enlarge it to the size of the enhanced layer picture 500 (S42), and provides the enlarged image portion to the estimator/predictor 102.

The MCTF encoder 100 incorporates position information of the selected portion of the base layer picture into a header of the current picture coded into residual data. The MCTF encoder 100 also sets and inserts a flag "flag_base-layer_cropping", which indicates that part of the base layer picture has been selected and used, in the picture header at an appropriate position so that the flag is delivered to the decoder. The position information is not transmitted when the flag "flag_base_layer_cropping" is reset.

Figure 5A:
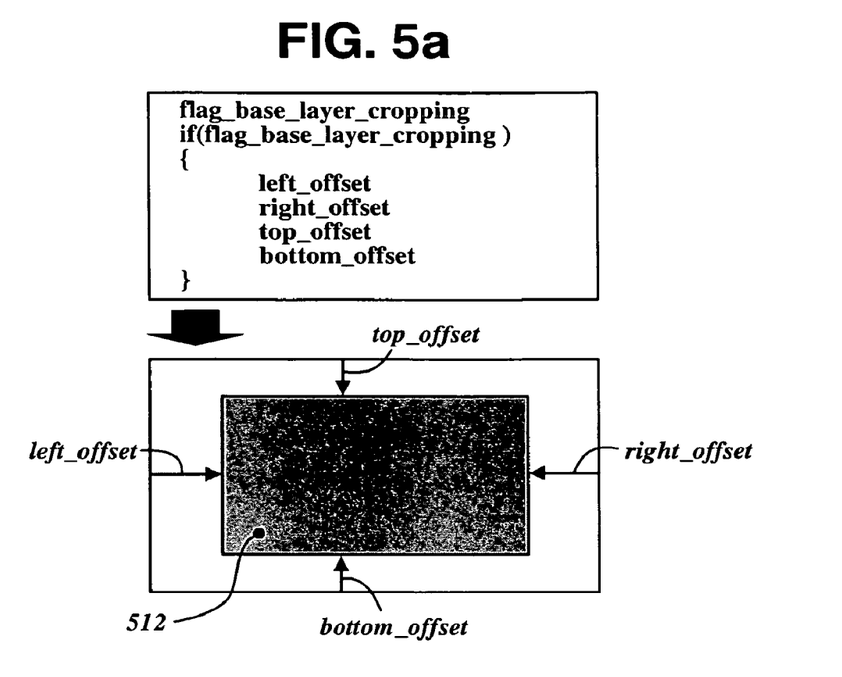
FIGS. 5a and 5b illustrate embodiments of the structure of information regarding a positional relationship of a base layer picture to an enhanced layer picture, which is transmitted to the decoder, according to the present invention.
Figure 5B:
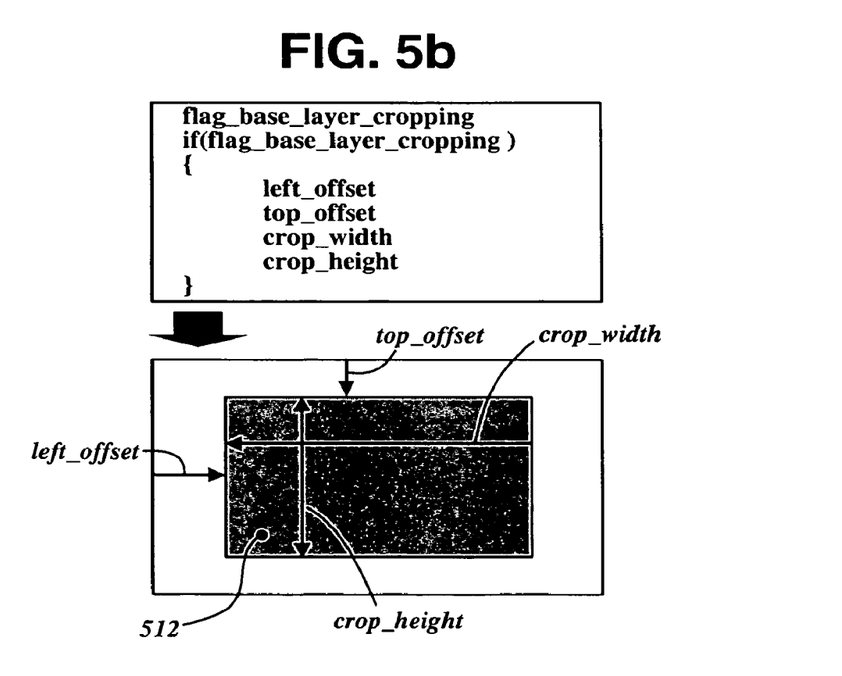

FIGS. 5a and 5b illustrate embodiments of the structure of information regarding a selected portion 512 of a base layer picture. In the embodiment of FIG. 5a, the selected portion 512 of the base layer picture is specified by offsets (left_offset, right_offset, top_offset, and bottom_offset) from the left, right, top and bottom boundaries of the base layer picture. The left offset indicates a position offset between left side pixels (or, for example, at least one pixel) in the base layer image and left side pixels in the selected portion 512. The top offset indicates a position offset between top side pixels (or, for example, at least one pixel) in the base layer image and top side pixels in the selected portion 512. The right offset indicates a position offset between right side pixels (or, for example, at least one pixel) in the base layer image and right side pixels in the selected portion 512. The bottom side offset indicates a position offset between bottom side pixels (or, for example, at least one pixel) in the base layer image and bottom side pixels in the selected portion 512. In the embodiment of FIG. 5b, the selected portion 512 of the base layer picture is specified by offsets (left_offset and top_offset) from the left and top boundaries of the base layer picture and by the width and height (crop_width and crop_height) of the selected portion 512. Various other specifying methods are also possible.

Figure 6:
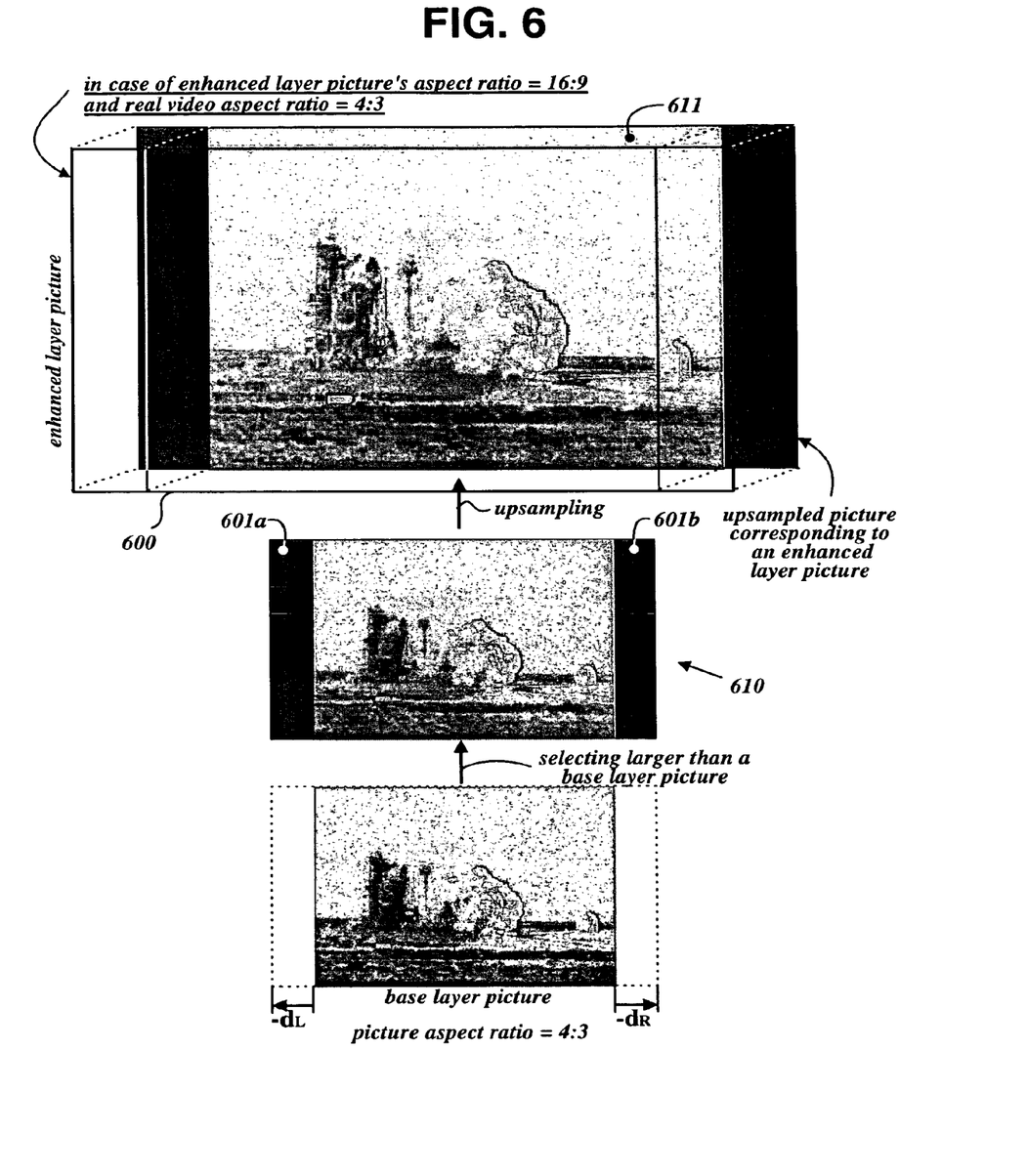
FIG. 6 illustrates how an area including a base layer picture is enlarged to be used for a prediction operation of an enhanced layer picture according to another embodiment of the present invention.

The offsets in the information of the selected portion shown in FIGS. 5a and 5b may have negative values. For example, as shown in FIG. 6, when a base layer picture has an aspect ratio of 4:3, an enhanced layer picture 600 has an aspect ratio of 16:9, and an actual image portion of the picture has an aspect ratio of 4:3, the left and right offset values (left_offset and right_offset) have negative values $-d_L$ and $-d_R$. Portions 601a and 601b extended from the base layer picture are specified by the negative values $-d_L$ and $-d_R$. The extended portions 601a and 601b are padded with off-screen data, and a picture 610 including the extended portions 601a and 601b is upsampled to have the same size as that of the enhanced layer picture 600. Accordingly, data of an area 611 in the enlarged base layer picture, which corresponds to an actual image portion of the enhanced layer picture 600, can be used for prediction of the actual image portion of the enhanced layer picture 600.

Since the offset fields of the information illustrated in FIGS. 5a and 5b may have negative values, the same advantages as described above in the example of FIG. 4 can be achieved by using the information of FIGS. 5a and 5b as position information of an area overlapping with the enhanced layer picture, which is to be associated with the enlarged base layer picture, instead of using the information of FIGS. 5a and 5b for specifying the selected area in the base layer picture.

Figure 7:
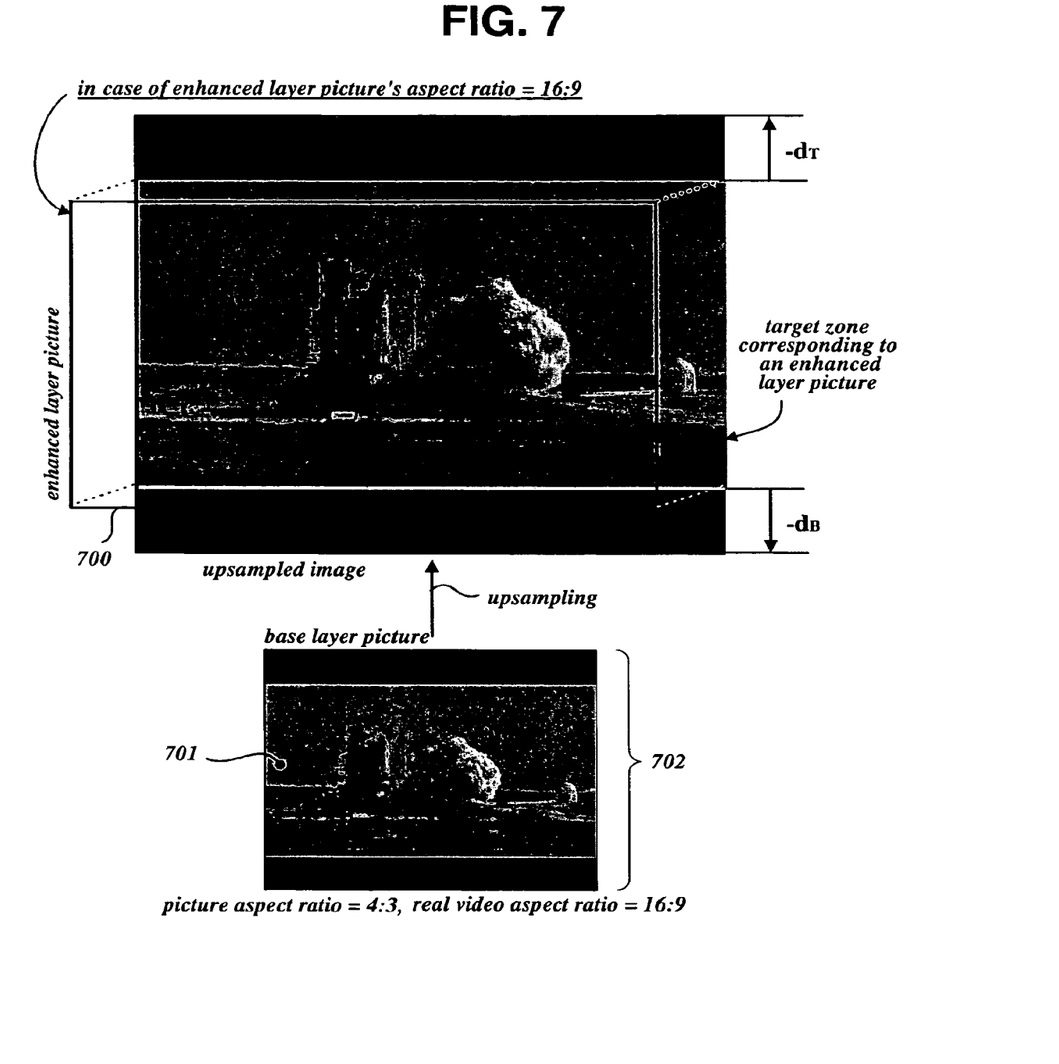
FIG. 7 illustrates how a base layer picture is enlarged to a larger area than an enhanced layer picture so as to be used for a prediction operation of the enhanced layer picture according to yet another embodiment of the present invention.

Specifically, with reference to FIG. 7, when a base layer picture 702 is upsampled so that an actual image area 701 of the base layer picture 702 is enlarged to the size of an enhanced layer picture 700, the enlarged (e.g., up-sampled) picture corresponds to an area larger than the enhanced layer picture 700. In this example, top and bottom offsets top_offset and bottom_offset are included in the position information of an area overlapping with the enhanced layer picture 700. These offsets correspond to the enlarged base layer picture, and are assigned negative values $-d_T$ and $-d_B$ so that only an actual image area of the enlarged base layer picture is used for prediction of the enhanced layer picture 700. In the example of FIG. 7, left and right offsets of the position information of the area corresponding to the enlarged base layer picture are zero. However, it will be understood that the left and right offsets may be non-zero, and also correspond to the enlarged base layer picture. It will also be appreciated that a portion of the image in the enlarged base layer picture may not be used in determining the enhanced layer picture. Similarly, when the offset information corresponds to the base layer picture, as opposed to the up-sample base layer picture, a portion of the image in the base layer picture may not be used in determining the enhanced layer picture.

Furthermore, in this embodiment, the left offset indicates a position offset between left side pixels (or, for example, at least one pixel) in the up-sampled base layer image and left side pixels in the enhanced layer image. The top offset indicates a position offset between top side pixels (or, for example, at least one pixel) in the up-sampled base layer image and top side pixels in the enhanced layer image. The right offset indicates a position offset between right side pixels (or, for example, at least one pixel) in the up-sampled base layer image and right side pixels in the enhanced layer image. The bottom side offset indicates a position offset between bottom side pixels (or, for example, at least one pixel) in the up-sampled base layer image and bottom side pixels in the enhanced layer image.

As described above, the information of FIGS. 5a and 5b can be used as information for selection of a portion of a base layer picture, which is to be used for prediction of an enhanced layer picture, or can be used as position information of an area overlapping with an enhanced layer picture, which is to be associated with a base layer picture for use in prediction of the enhanced layer picture.

Information of the size and aspect ratio of the base layer picture, mode information of an actual image of the base layer picture, etc., can be determined by decoding, for example, from a sequence header of the encoded base layer stream. Namely, the information may be recorded in the sequence header of the encoded base layer stream. Accordingly, the position of an area overlapping with the enhanced layer picture, which corresponds to the base layer picture or the selected area in the base layer picture described above, are determined based on position or offset information, and all or part of the base layer picture is used to suit this determination.

Returning to FIGS. 1 and 2, the MCTF encoder 100 generates a sequence of H frames and a sequence of L frames, respectively, by performing the 'P' and 'U' operations described above on a certain-length sequence of pictures, for example, on a group of pictures (GOP). Then, an estimator/predictor and an updater at a next serially-connected stage (not shown) generates a sequence of H frames and a sequence of L frames by repeating the 'P' and 'U' operations on the generated L frame sequence. The 'P' and 'U' operations are performed an appropriate number of times (for example, until one L frame is produced per GOP) to produce a final enhanced layer sequence.

The data stream encoded in the method described above is transmitted by wire or wirelessly to a decoding apparatus or is delivered via recording media. The decoding apparatus reconstructs the original video signal in the enhanced and/or base layer according to the method described below.

Figure 8:
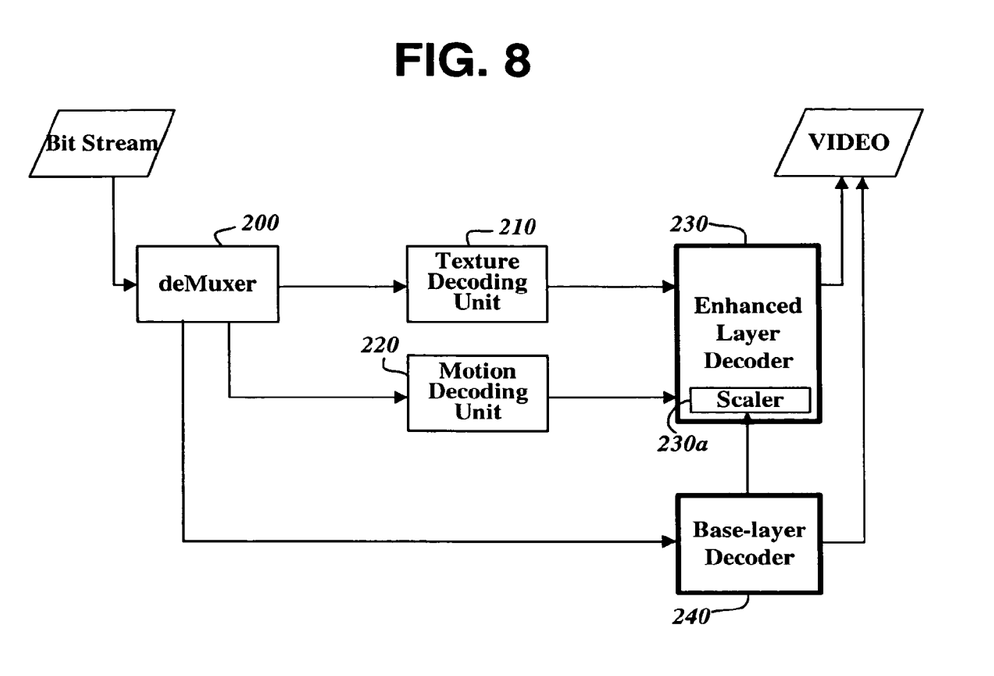
FIG. 8 is a block diagram of an apparatus for decoding a data stream encoded by the apparatus of FIG. 1.

FIG. 8 is a block diagram of an apparatus for decoding a data stream encoded by the apparatus of FIG. 1. The decoding apparatus of FIG. 8 includes a demuxer (or demultiplexer) 200, a texture decoding unit 210, a motion decoding unit 220, an MCTF decoder 230, and a base layer decoder 240. The demuxer 200 separates a received data stream into a compressed motion vector stream, a compressed macroblock information stream, and a base layer stream. The texture decoding unit 210 reconstructs the compressed macroblock information stream to its original uncompressed state. The motion decoding unit 220 reconstructs the compressed motion vector stream to its original uncompressed state. The MCTF decoder 230 is an enhanced layer decoder which converts the uncompressed macroblock information stream and the uncompressed motion vector stream back to an original video signal according to an MCTF scheme. The base layer decoder 240 decodes the base layer stream according to a specified scheme, for example, according to the MPEG-4 or H.264 standard.

Figure 9:
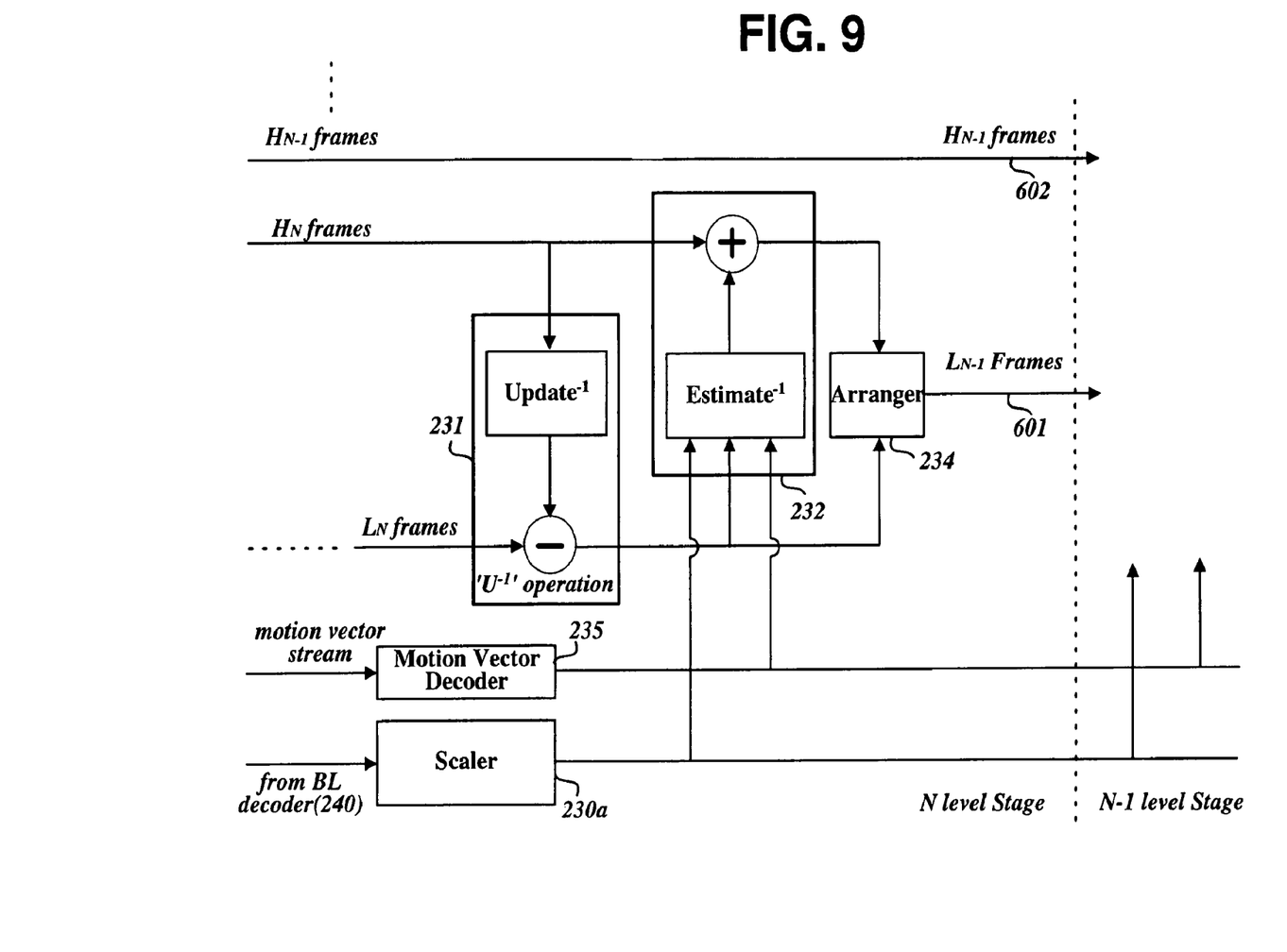
FIG. 9 is a block diagram of part of an MCTF decoder shown in FIG. 8 responsible for carrying out inverse prediction and update operations.

The MCTF decoder 230 includes, as an internal element, an inverse filter that has a structure as shown in FIG. 9 for reconstructing an input stream to its original frame sequence.

FIG. 9 shows some elements of the inverse filter for reconstructing a sequence of H and L frames of MCTF level N to a sequence of L frames of level N−1. The elements of the inverse filter of FIG. 9 include an inverse updater 231, an inverse predictor 232, a motion vector decoder 235, an arranger 234, and a scaler 230a. The inverse updater 231 subtracts pixel difference values of input H frames from corresponding pixel values of input L frames. The inverse predictor 232 reconstructs input H frames to frames having original images with reference to the L frames, from which the image differences of the H frames have been subtracted, and/or with reference to enlarged pictures output from the scaler 240a. The motion vector decoder 235 decodes an input motion vector stream into motion vector information of each block and provides the motion vector information to an inverse predictor (for example, the inverse predictor 232) of each stage. The arranger 234 interleaves the frames completed by the inverse predictor 232 between the L frames output from the inverse updater 231, thereby producing a normal video frame sequence. The scaler 230a enlarges small-screen pictures of the base layer to the enhanced layer picture size, for example, according to the information as shown in FIGS. 5a and 5b.

The L frames output from the arranger 234 constitute an L frame sequence 601 of level N−1. A next-stage inverse updater and predictor of level N−1 reconstructs the L frame sequence 601 and an input H frame sequence 602 of level N−1 to an L frame sequence. This decoding process is performed the same number of times as the number of MCTF levels employed in the encoding procedure, thereby reconstructing an original video frame sequence. With reference to 'reference selection code' information carried in a header of each macroblock of an input H frame, the inverse predictor 232 specifies an L frame of the enhanced layer and/or an enlarged frame of the base layer which has been used as a reference frame to code the macroblock to residual data. The inverse predictor 232 determines a reference block in the specified frame based on a motion vector provided from the motion vector decoder 235, and then adds pixel values of the reference block (or average pixel values of two macroblocks used as reference blocks of the macroblock) to pixel difference values of the macroblock of the H frame; thereby reconstructing the original image of the macroblock of the H frame.

When a base layer picture has been used as a reference frame of a current H frame, the scaler 230a selects and enlarges an area in the base layer picture (in the example of FIG. 4) or enlarges a larger area than the base layer picture (in the example of FIG. 6) based on positional relationship information as shown in FIGS. 5a and 5b included in a header analyzed by the MCTF decoder 230 so that the enlarged area of the base layer picture is used for reconstructing macroblocks containing residual data in the current H frame to original image blocks as described above. The positional relationship information is extracted from the header and is then referred to when information indicating whether or not the positional relationship information is included (specifically, the flag "flag_base_layer_cropping" in the example of FIGS. 5a and 5b) indicates that the positional relationship information is included.

In the case where the information of FIGS. 5a and 5b has been used as information indicating the position of an area overlapping with an enhanced layer picture, to use in prediction of the enhanced layer picture, the inverse predictor 232 uses an enlarged one of the base layer picture received from the scaler 230a for prediction of the enhanced layer picture by associating the entirety of the enlarged base layer picture with all or part of the current H frame or with a larger area than the current H frame according to the values (positive or negative) of the offset information. In the case of FIG. 7 where the enlarged base layer picture is associated with a larger area than the current H frame, the predictor 232 uses only an area in the enlarged base layer picture, which corresponds to the H frame, for reconstructing macroblocks in the current H frame to their original images. In this example, the offset information included negative values.

For one H frame, the MCTF decoding is performed in specified units, for example, in units of slices in a parallel fashion, so that the macroblocks in the frame have their original images reconstructed and the reconstructed macroblocks are then combined to constitute a complete video frame.

The above decoding method reconstructs an MCTF-encoded data stream to a complete video frame sequence. The decoding apparatus decodes and outputs a base layer sequence or decodes and outputs an enhanced layer sequence using the base layer depending on its processing and presentation capabilities.

The decoding apparatus described above may be incorporated into a mobile communication terminal, a media player, or the like.

As is apparent from the above description, a method and apparatus for encoding/decoding a video signal according to the present invention uses pictures of a base layer provided for low-performance decoders, in addition to pictures of an enhanced layer, when encoding a video signal in a scalable fashion, so that the total amount of coded data is reduced, thereby increasing coding efficiency. In addition, part of a base layer picture, which can be used for a prediction operation of an enhanced layer picture, is specified so that the prediction operation can be performed normally without performance degradation even when a picture enlarged from the base layer picture cannot be directly used for the prediction operation of the enhanced layer picture.

Although this invention has been described with reference to the example embodiments, it will be apparent to those skilled in the art that various improvements, modifications, replacements, and additions can be made in the invention without departing from the scope and spirit of the invention. Thus, it is intended that the invention cover the improvements, modifications, replacements, and additions of the invention.

We claim:

1. A method for decoding a video signal in a video decoder apparatus, comprising:

obtaining, with the video decoder apparatus, offset information between at least one boundary pixel of a reference frame and at least one boundary pixel of a current frame from a sequence header or a slice header, the reference frame being upsampled from a frame of the base layer;

obtaining, with the video decoder apparatus, position information of a reference block in the reference frame based on the offset information;

obtaining, with the video decoder apparatus, a reference pixel value based on the position information of the reference block; and decoding, with the video decoder apparatus, a current block in the current frame of an enhanced layer using the reference pixel value, the offset information including, left offset information indicating a position offset between at least one left side pixel of the reference frame and at least one left side pixel of the current frame, top offset information indicating a position offset between at least one top side pixel of the reference frame and at least one top side pixel of the current frame, right offset information indicating a position offset between at least one right side pixel of the reference frame and at least one right side pixel of the current frame, and bottom offset information indicating a position offset between at least one bottom side pixel of the reference frame and at least one bottom side pixel of the current frame.

2. The method of claim 1, wherein a spatial resolution of the enhanced layer is higher than a spatial resolution of the base layer, the enhanced layer and the base layer being from a same video signal.

* * * * *